US006555610B1

(12) United States Patent
Blanton et al.

(10) Patent No.: US 6,555,610 B1
(45) Date of Patent: Apr. 29, 2003

(54) REDUCED CRYSTALLINITY POLYETHYLENE OXIDE WITH INTERCALATED CLAY

(75) Inventors: Thomas N. Blanton, Rochester, NY (US); Debasis Majumdar, Rochester, NY (US); Robert J. Kress, Rochester, NY (US); Dwight W. Schwark, Greenville, SC (US)

(73) Assignee: Eastman Kodak Company, Rochester, NY (US)

( * ) Notice: Subject to any disclaimer, the term of this patent is extended or adjusted under 35 U.S.C. 154(b) by 303 days.

(21) Appl. No.: 09/617,400

(22) Filed: Jul. 17, 2000

(51) Int. Cl.[7] .................................................. C08K 3/34
(52) U.S. Cl. ........................................................ 524/445
(58) Field of Search ........................................... 524/445

(56) References Cited

U.S. PATENT DOCUMENTS

| | | |
|---|---|---|
| 4,555,437 A | 11/1985 | Tanck |
| 4,578,285 A | 3/1986 | Viola |
| 4,741,969 A | 5/1988 | Hayama et al. |
| 4,753,908 A | 6/1988 | Kawase et al. |
| 5,011,814 A | 4/1991 | Harrison |
| 5,143,071 A | 9/1992 | Keusch et al. |
| 5,543,453 A | 8/1996 | Ito et al. |
| 5,552,469 A | 9/1996 | Beall et al. |

(List continued on next page.)

FOREIGN PATENT DOCUMENTS

EP        0 732 218 A1     9/1996

OTHER PUBLICATIONS

Ivkov, Robert et al., Structure and Dynamics of Polymersin Confined Geometries Annual Tech. Conf.—Society of Plastic Engineers (1999), 57th (vol. 2), 1783–1785.*

Aranda, Pilar et al. Polyethylene Oxide/$NH^+$–Smectite Nanocomposites. Applied Clay Science (1999), 15(1–2), 119–135.*

Ivkov, Robert et al. Polymer Dyanamics in Intercalated Clay–Polymer Nanocomposites. Book of Abstracts, 219th ACS National Meeting, San Francisco, CA Mar. 26–30, 2000.*

Mineralogical Society Monograph No. 5, "Crystal Structures of Clay Minerals and Their X–ray Identification", 1980, p. 5.

Structure of Crystalline Poymers, 1984, pp. 267–269.

J. Wu & M.M. Lerner, Chem. Mater, 1993, 5, pp. 835–838.

M. Chanda & S.K. Roy, Plastics Technology Handbook, 1993, p. 432.

M. Chanda & S.K. Roy, Plastics Technology Handbook, 1993, pp. 510–511.

Advanced Materials, 1995, vol. 7, No. 2, pp. 154–156.

Lemmon et al, "Preparation of Nanocomposites Containing Poly(ethylene oxide) and Layered Solids", 1995, pp. 2245–2249.

M.M. Doeff & J.S. Reed, Solid State Ionics, 1998, pp. 109–115.

Harris et al, Macromolecules, 1999, vol. 32, pp. 6718–6724.

Japanese Patent Abstract 62174148 A Jul. 1987.

*Primary Examiner*—Cephia D. Toomer
(74) *Attorney, Agent, or Firm*—Paul A. Leipold; Lynne M. Blank

(57) ABSTRACT

The invention relates to a method of forming a polymer composite comprising mixing smectite clay and polyvinyl pyrrolidone to form a first dispersion of intercalated clay, mixing said dispersion with polyethylene oxide to form a second dispersion, flowing said second dispersion into ketone so as to flocculate a polymer composite of polyethylene oxide and intercalated clay and recovering said flocculate, wherein the polyethylene oxide is rendered to reduced crystallinity.

29 Claims, 4 Drawing Sheets

U.S. PATENT DOCUMENTS

| | | |
|---|---|---|
| 5,560,996 A | 10/1996 | Ito et al. |
| 5,578,168 A | 11/1996 | Burdick et al. |
| 5,589,545 A | 12/1996 | Ramachandran et al. |
| 5,618,316 A | 4/1997 | Hoffman et al. |
| 5,644,350 A | 7/1997 | Ando et al. |
| 5,674,578 A | 10/1997 | Giori |
| 5,688,603 A | 11/1997 | Iqbal et al. |
| 5,866,292 A | 2/1999 | Chamberlain et al. |
| 5,866,669 A | 2/1999 | Takatsu et al. |
| 5,888,635 A | 3/1999 | Yang et al. |
| 5,891,611 A | 4/1999 | Majumdar et al. |
| 5,916,969 A | 6/1999 | Wang et al. |
| 5,981,126 A | 11/1999 | Majumdar et al. |
| 6,010,971 A | 1/2000 | Tsai et al. |
| 6,025,119 A | 2/2000 | Majumdar et al. |
| 6,033,466 A | 3/2000 | Ito |
| 6,063,836 A | 5/2000 | Ito et al. |
| 6,177,501 B1 | 1/2001 | Ito et al. |
| 6,281,270 B1 | 8/2001 | Ito et al. |

* cited by examiner

US 6,555,610 B1

REDUCED CRYSTALLINITY POLYETHYLENE OXIDE WITH INTERCALATED CLAY

FIELD OF THE INVENTION

This invention relates in general to a method for rendering polyethylene oxide to a material of reduced crystallinity. More specifically, this invention relates to a method of forming a polymer composite comprising mixing smectite clay and polyvinyl pyrrolidone to form a first dispersion of intercalated clay, mixing said dispersion with polyethylene oxide to form a second dispersion, flowing said second dispersion into ketone so as to flocculate a polymer composite, and recovering said flocculate.

BACKGROUND OF THE INVENTION

Polymers find a wide range of applications for use as films and coatings. In many instances, these films or coatings must be transparent. In addition to the transparency issue, these films or coatings should be able to be manufactured at a low cost and with as simple procedure as possible. For many polymers, transparent coatings or films can be generated but require melt extrusion or expensive organic solvents. It is preferable to be able to generate materials, which can be formulated using aqueous based systems. However, at high polymer concentration (greater than or equal to 50 weight %), many of these aqueous soluble/dispersible polymers will show significant crystallization upon drying, rendering the resultant films or coatings hazy due to light scattering from the crystallites in the polymeric film.

Polyethylene oxide polymers are high molecular weight water-soluble polymers with a wide variety of applications. Some of these applications are detailed in product brochures of Union Carbide for their Polyox water-soluble resins. According to such product literature, polyethylene oxide can be used as binders for pigments, fillers, metal powders, and ceramics with application in battery electrodes, cathode ray tubes, and fluorescent lamps. The strong hydrogen bonding affinity of polyethylene oxide accounts for its association with various polar compounds, such as phenolic resins, mineral acids, halogens, ureas, lignin sulfonic acids, and poly carboxylic acids. These novel complexes can be discrete chemical entities with unique properties with application in batteries, microencapsulated inks, slow release bacteriostats, water soluble adhesives, etc. Polyethylene oxide can form water-retentive gels with application as absorbent pads and diapers. Polyethylene oxide can be used as emollient in cosmetic and hair products. Most importantly, polyethylene oxide can be formed into flexible films both by thermoplastic processing and casting techniques, providing wide latitude of applications. As thermoplastics, these films are readily calendered, extruded, molded, or cast. Sheets and films of polyethylene oxide can be oriented to develop high strength. Polyethylene oxide films are inherently flexible and tough, and resistant to most oils and greases. Polyethylene oxide can be used alone or blended with a wide variety of other polymers such as polyethylene, polystyrene, polycaprolactone, ethylene vinyl acetate, nylon, etc. In packaging, polyethylene oxide can be used to provide heat-sealability, hot melt adhesion, improved resistance to humidity, lubricity, controlled release, bio-degradability, and non-toxicity. However, as noted in the product literature, polyethylene oxide, particularly the higher molecular weight grades, retains a very high degree of crystalline character at temperatures far above the melting point. This retained crystallinity renders these materials unsuitable in applications requiring transparency for aesthetic or optical reasons.

Additional applications of polyethylene oxide include U.S. Pat. No. 5,143,071 which describes the formation of non-stringy adhesive hydrophilic gels using polyethylene oxide and water or polyvinyl pyrrolidone, and may have a water-soluble electrolyte added to provide conductive non-stringy adhesive materials for medical electrodes. To make effective, these polymeric mixtures must be cross-linked using exposure to radiant energy, then remain tacky such that the adhesive can adhere to a subject's skin without discomfort.

U.S. Pat. No. 5,866,292 describes a liquid developer composition with a copolymer, where a charged liquid developer is comprised of a nonpolar liquid, thermoplastic resin particles, pigment, a charge director, and a charge control agent comprised of a polyethylene oxide:polypropylene oxide blend in a solid form.

A resin for paper making is described in U.S. Pat. No. 5,866,669. Sulfonated phenol-formaldehyde is combined with polyethylene oxide to yield a paper, which has long life and improves the yield of fine fiber and filler reducing the water treatment waste load. Another polyethylene oxide application for paper manufacture is described in U.S. Pat. No. 5,578,168 where polyethylene oxide is dispersed with a salt to form a suspension with at least 15% polyethylene oxide by weight. The said suspension prevents the loss of fiber fines during paper manufacture and resists viscosity loss.

A thermoplastic composition is described in U.S. Pat. No. 6,010,971 where polyethylene oxide is mixed with a multicarboxylic acid (ex: adipic acid). Such a material can be extruded into fibers and formed into a nonwoven structure and may be used for disposable absorbent products intended for the absorption of fluids such as body fluids. A similar application can be found in U.S. Pat. No. 5,916,969 where polyethylene oxide is blended with polyolefins for disposable absorbent articles such as a diaper or feminine pad. Such a material can be produced only under melt conditions.

U.S. Pat. No. 5,618,316 describes an invention to provide an intraocular lens having improved biocompatibility achieved by applying a polyethylene oxide coating to the lens surface through covalent bonding.

U.S. Pat. No. 5,589,545 describes molded polymer blends which become lubricious when exposed to water with end uses in personal care articles, e.g., lubricious strips for razors, and in medical articles, e.g., catheters.

U.S. Pat. No. 5,011,814 describes a dye-receiving element for thermal dye transfer including a support having on one side thereof a polymeric dye image-receiving layer and on the other side thereof a backing layer made from a mixture of PEO and submicrometer colloidal inorganic particles.

U.S. Pat. No. 5,674,578 describes water soluble/dispersible multilayered film of high interlayer adhesive strength and collection pouches formed therefrom, with high load bearing capacity but easily disposable.

In the literature, examples are provided where PEO is blended with clay materials for the purpose of obtaining enhanced properties such as modulus. Lerner and coworkers (Chem. Mater., (1993), 5, p. 835; Elect. Acta, (1995), 40, p. 2245) described the generation of polyethylene oxide and Na-montmorillonite clay nanocomposites where the polyethylene oxide and clay were added to water. After 24 hours of stirring, followed by vacuum drying, they were able to successfully intercalate PEO into the clay lattice up to 30 wt. % polyethylene oxide. However, at polyethylene oxide levels greater than 30 wt. %, crystalline polyethylene oxide was observed. Giannelis and coworkers (Adv. Mater., (1995), 7, p. 154), working on polymer electrolyte nanocomposites, observed similar intercalation effects when they worked with polyethylene oxide and Na or Li exchanged silicate clays. In their materials preparation, montmorillonite clay (28 wt. %) was mixed with PEO and annealed for 6 hours at 80° C. Before annealing, crystalline polyethylene oxide was observed to be present in the sample. After the long annealing time, the crystalline PEO was not observed indicating that it had intercalated inside the clay. Like Lerner, Giannelis found that at a higher clay level, 40 wt. %, crystalline polyethylene oxide was present that did not intercalate the clay. A method of making clay-polyethylene oxide nanocomposites using acetonitrile as the solvent is described by Schmidt-Rohr and coworkers (Macromol., (1999), 32, P. 6718). They, like Giannelis, also found that when polyethylene oxide is at a 40 wt.% level in the nanocomposite, excess crystalline polyethylene oxide could be detected. Doeff and Reed (Sol. State Ion., (1998), 113–115, P. 109) describe a very laborious and time-consuming method of attempting to produce high weight percent polyethylene oxide nanocomposites. A 1 wt. % clay in water solution was stirred for one-half hour followed by the addition of LiCl to make a 1 molar solution. This solution was then stirred for a minimum of 48 hours. The suspension that was created was then dialyzed to remove salt. Polyethylene oxide was then added and stirred for an additional 24 hours. Solutions were then coated on glass and dried at 120° C. for a minimum of 48 hours. However, samples at 70 wt. % polyethylene oxide were found to contain crystalline polyethylene oxide in addition to the intercalated clay.

Use of polyethylene oxide, with and without various addenda, in ink jet applications can be found in related patent literature (e.g., U.S. Pat. Nos. 5,888,635; 5,688,603; 5,781,216; and EP 0 732 218 A1). However, the issue regarding the degree of crystallinity of polyethylene oxide is neither resolved nor adequately addressed.

It is clear that although the prior art is replete with numerous applications utilizing polyethylene oxide, there remains an important need for further innovation for a method of generating reduced crystallinity polyethylene oxide-containing materials. Reduced crystal materials are more transparent. Additionally, there is a need for producing polyethylene oxide-containing materials which can be used as coatings and films, with reduced or no haze, resulting from reduced polyethylene oxide crystallinity, using materials of modest cost and in a simple and economic process.

PROBLEM TO BE SOLVED BY THE INVENTION

There remains a need for a nanocomposite material with reduced crystallinity polyethylene oxide, in particular, nanocomposite materials containing a smectite clay, polyvinyl pyrrolidone, and polyethylene oxide.

SUMMARY OF THE INVENTION

It is an object of the invention to provide a method for producing improved nanocomposite materials containing polyethylene oxide, smectite clay, and polyvinyl pyrrolidone.

It is another object of the invention to reduce or eliminate the crystallinity of the polyethylene oxide in nanocomposite materials where the weight fraction of polyethylene oxide is greater than 50%.

It is another object of the invention to reduce or eliminate the haze in articles, especially films and coatings, generated from nanocomposite materials where the weight fraction of polyethylene oxide can be greater than 50%.

These and other objects of the invention are accomplished by a method of forming a polymer composite comprising mixing smectite clay and polyvinyl pyrrolidone to form a first dispersion of intercalated clay, mixing said dispersion with polyethylene oxide to form a second dispersion, flowing said second dispersion into ketone so as to flocculate a polymer composite, and recovering said flocculate.

ADVANTAGEOUS EFFECT OF THE INVENTION

This invention provides nanocomposite materials for articles, especially films and coatings, which have transparency or reduced haze. The nanocomposite materials formed by the invention have improved mechanical properties, as well as being more transparent than prior polyethylene oxide polymer materials. It is surprising that haze reduction in the polyethylene oxide occurs when an intercalated clay is added to make a nanocomposite material. The materials of the invention find use as hydrophilic layers. They are particularly useful in overcoats for ink jet, other printing papers, and transparency display materials. They also may be used as hydrophilic layers on cutting devices, such as razor blades.

DETAILED DESCRIPTION OF THE INVENTION

Figure 1:
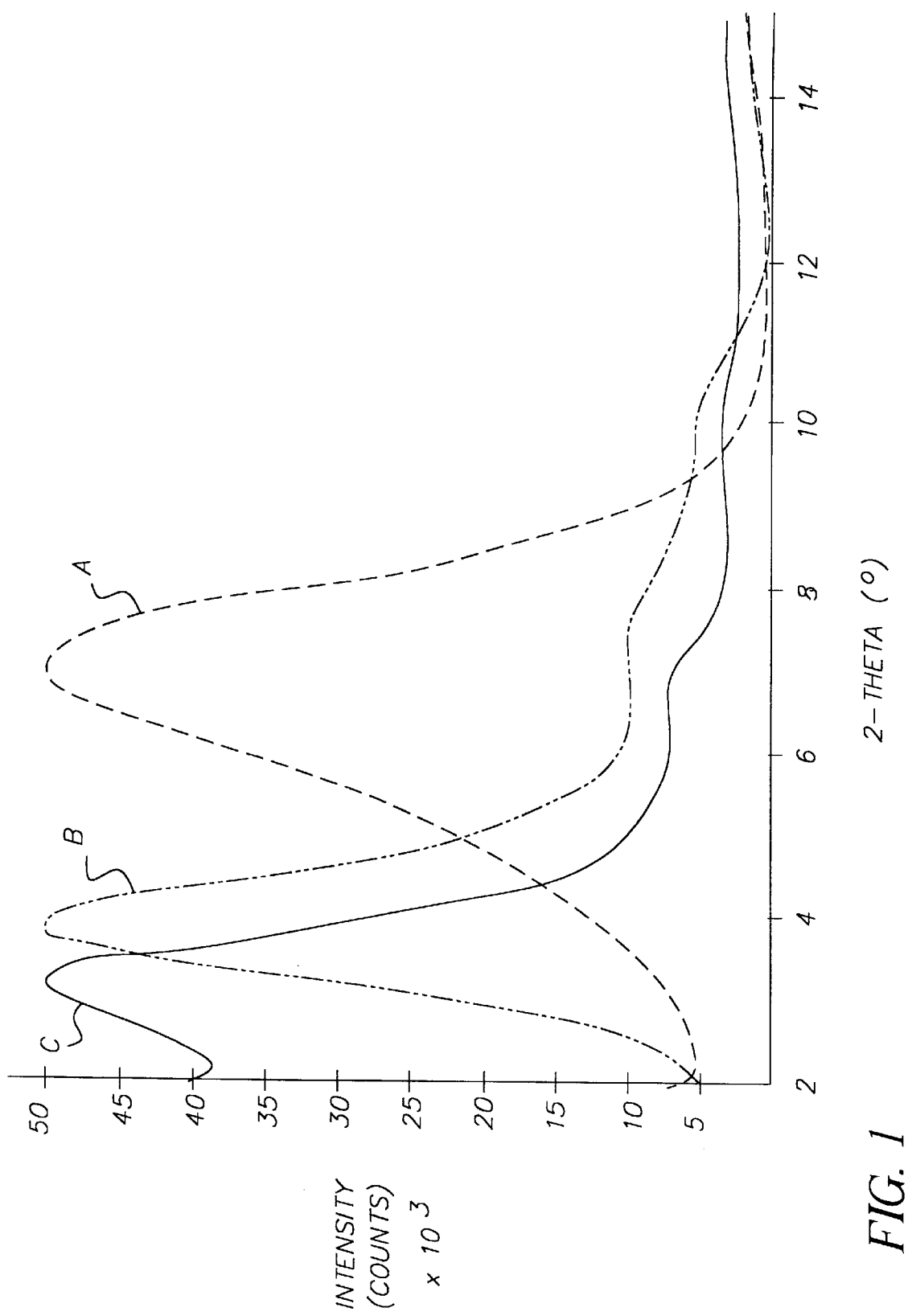
FIG. 1. XRD patterns from dry samples of (A) synthetic hectorite clay, (B) a composite of synthetic hectorite clay and PVP, and (C) Example 1.

In the process described in this invention, polyethylene oxide is combined with a smectite clay and polyvinyl pyrrolidone followed by flowing said combination into ketone. The resulting flocculate is isolated and dried yielding a nanocomposite with reduced or no polyethylene oxide crystallinity. A significant advantage of the method described in this invention is the generation of a reduced crystallinity or noncrystalline polyethylene oxide at levels, which can be greater than 50 weight percent in the polyethylene oxide containing nanocomposite. Using the method described in this invention, one is now able to generate polyethylene oxide containing materials that can be used for applications requiring transparency or reduced haze.

The nanocomposite material generated by the present invention is comprised of at least three primary components: clay (component A), polyvinyl pyrrolidone (component B), and polyethylene oxide (component C). A "nanocomposite material" is a composite where one of the components is of the order of less than 400 nanometers.

The silica based clay material (component A) used in this invention belongs to the general class of phyllosilicates, group smectites, sub-groups saponites or montmorillonites, (G. W. Brindley and G. Brown, Crystal Structures of Clay Minerals and their X-ray Identification, Spottiswoode Ballantyne Ltd., London, (1984), p. 5), with the preferred species being hectorites or montmorillonites. Both clay species can be found as natural swelling clays, the swelling being the result of water, organic liquids, inorganic and organic components, cations, and the like intercalating between silicate layers in the clay. Examples of clay intercalation have been given in U.S. Pat. Nos. 6,025,119; 5,981,126; and 5,891,611. Both clays comprise a layered hydrous magnesium silicate component. For the present invention, both natural and synthetic clays can be used. Montmorillonite clays, suitable for this invention, can be obtained from many commercial sources and must be treated to remove natural impurities, such as quartz and other minerals and rock components. The montmorillonite clay suitable for this invention can comprise of particles of a lateral dimension between 0.01 $\mu$m and 10 $\mu$m and a thickness between 0.0005 $\mu$m and 0.1 $\mu$m. The preferred lateral dimension is between 0.05 $\mu$m and 1 $\mu$m, and the preferred thickness is between 0.001 $\mu$m and 0.1 $\mu$m. Hectorite clay is relatively rare and occurs contaminated with other minerals such as quartz which is difficult and expensive to remove.

Synthetic smectite, the most preferred clay for the present invention, is free from natural impurities, prepared under controlled conditions. One such synthetic smectite is commercially marketed under the trade name Laponite by Laporte Industries, Ltd. of UK through its US subsidiary, Southern Clay Products, Inc. It is a layered hydrous magnesium silicate, in which magnesium ions, partially replaced by suitable monovalent ions such as lithium, sodium, potassium, and/or vacancies, are octahedrally coordinated to oxygen and/or hydroxyl ions, some of which may be replaced by fluorine ions, forming the central octahedral sheet; such an octahedral sheet is sandwiched between two tetrahedral sheets of silicon ions, tetrahedrally coordinated to oxygen. The Laponite clay suitable for this invention is comprised of particles of a lateral dimension between 0.005 $\mu$m and 10 $\mu$m and a thickness between 0.0005 $\mu$m and 0.1 $\mu$m. The preferred lateral dimension is between 0.005 $\mu$m and 1 $\mu$m, and the preferred thickness is between 0.001 $\mu$m and 0.1 $\mu$m because this thickness has the least haze. The most preferred lateral dimension for synthetic smectite clay is between 0.005 $\mu$m and 0.05 $\mu$m because this lateral dimension has the least haze. There are many grades of Laponite such as RD, RDS, J, S, etc., each with unique characteristics and can be used for the present invention. Some of these products contain a polyphosphate peptizing agent such as tetrasodium pyrophosphate for rapid dispersion capability; alternatively, a suitable peptizer can be incorporated into Laponite later on for the same purpose.

Polyvinyl pyrrolidone (component B) used in this invention is preferably water-soluble and is capable of intercalating inside the clay lattice. U.S. Pat. No. 5,552,469 shows that polyvinyl pyrrolidone can be used to intercalate clay. Polyvinyl pyrrolidone is produced by free-radical-initiated chain polymerization of N-vinyl pyrrolidone. Polymerization is usually carried out in an aqueous solution to produce a solution containing 30% polymer. Polyvinyl pyrrolidone is commercially available either in a liquid form or as a dried powder. Details about polyvinyl pyrrolidone can be found in appropriate literature, e.g., M. Chanda and S. K. Roy, Plastics Technology Handbook, Marcel Dekker, Inc., New York, (1993), p. 432. Component B of the present invention can alternatively be an interpolymer of vinyl pyrrolidone with copolymerizable monomers such as vinyl acetate, methyl acrylate, methyl, methacrylate, ethyl acrylate, ethyl methacrylate, butyl acrylate, butyl methacrylate, methyl acrylamide, methyl methacrylamide, and vinyl chloride. However, it is important that these interpolymers are also capable of intercalating inside the clay lattice. Typical molecular weight desired of these polymers for application in this invention fall between 100 and 1,000,000, preferably between 1,000 and 500,000, and most preferably between 20,000 and 50,000 for best ease of formulation for coating. A wide variety of the vinyl pyrrolidone polymers are commercially available and/or are disclosed in a number of U.S. Patents including U.S. Pat. Nos. 4,741,969; 4,503,111; 4,555,437 and 4,578,285.

Polyethylene oxide (component C), used in the present invention is a water soluble polymer which is found to be semicrystalline with a monoclinic crystal structure with chains in a 7/2 helical conformation (C. P. Buckley and A. J. Kovacs, Structure of Crystalline Polymers, I. H. Hall ed., Elsevier Applied Science Pub., New York, (1984), p. 267). As noted hereinabove in the Background Of Invention section, polyethylene oxide is known to be capable of intercalating inside clays. Polyethylene oxide can be obtained as commercial products from a number of sources, such as PEO™ from Seitetsu Kagaku Company, Ltd. (Japan), Alkox™ from Meisei Chemical Works, Ltd. (Japan), or Polyox™ from Union Carbide (USA). Polyethylene oxides of low molecular weight, i.e., below 3,000, are terminated mainly by hydroxyl groups and are often referred to as polyethylene glycols. Commercial polyethylene oxide resins can be supplied in the molecular weight range of 100,000 to 1 million and above. These materials are free flowing dry powders soluble in a broad range of solvents including water as noted in literature, M. Chanda and S. K. Roy, Plastics Technology Handbook, Marcel Dekker, Inc., New York, (1993), p. 510. The molecular weight range of polyethylene oxide suitable for this invention is 1,000 to 5,000,000, with a preferred range of 100,000 to 500,000 for best coating.

In a preferred embodiment of the present invention, the method for rendering polyethylene oxide to a material of reduced crystallinity is as follows:

A dispersion of clay and polyvinyl pyrrolidone in water is prepared which is referred to as the first dispersion. The total solid content of the first dispersion can be less than 99% and preferably less than 50% and more preferably less than 10%. The first dispersion can be prepared by combining dry clay, polyvinyl pyrrolidone, and water in any order. Alternatively, an aqueous clay sol (clay dispersion in water) can be combined with either dry polyvinyl pyrrolidone or its aqueous solution in any order to form the first dispersion. The clay:polyvinyl pyrrolidone ratio in the first dispersion can vary between 80:20 and 20:80, or in other words the first dispersion solids content has a clay weight percent range of 20 to 80 and a polyvinyl pyrrolidone weight percent range of 80 to 20, and preferably between 70:30 and 50:50, or in other words first dispersion solids content has a clay weight percent range of 50 to 70 and a polyvinyl pyrrolidone weight percent range of 50 to 30, because this ratio gives the best intercalation and good intensifying properties. In a most preferred embodiment, an aqueous clay sol of less than 10 weight % solid is slowly added to an aqueous solution of polyvinyl pyrrolidone of less than 10 weight % solid in a clay:polyvinyl pyrrolidone ratio of 70:30, or in other words the first dispersion solids content has preferred clay weight percent of 70 and a preferred polyvinyl pyrrolidone weight percent of 30. The first dispersion is agitated to ensure intercalation of polyvinyl pyrrolidone inside the clay lattice. Depending on the viscosity of the first dispersion, this intercalation can be achieved through agitation for less than an hour to a few hours. Besides clay, polyvinyl pyrrolidone, and water, the first dispersion can contain additional ingredients. Such addenda can include, but are not limited to, surfactants, coating aids, dispersants, other solvents, plasticizers, inorganic or organic particles, electrically conducting or non-conducting materials, salts, electrolytes, other polymers and clay intercalants (materials capable of intercalating inside the clay lattice), lubricating agents, cross-linking agents, colorants and dyes, compatibilizers, biocites, controlled-release agents, drugs, aroma or fragrance providing agents, etc.

The first dispersion is next combined with polyethylene oxide to form what is referred to as the second dispersion. The total solid content of the second dispersion can be less than 99% and preferably less than 50% and more preferably less than 30% for good coating properties. The second dispersion can be formed by either adding dry polyethylene oxide to the first dispersion or by adding an aqueous solution of polyethylene oxide to the first dispersion. The dry weight % of polyethylene oxide in the dry solid content of the second dispersion can vary from 1 to 99 %, preferably from 10 to 90%, and more preferably from 50 to 80%. The second dispersion is agitated to ensure further intercalation of the polyethylene oxide inside the clay lattice, which is already intercalated with polyvinyl pyrrolidone. Depending on the viscosity of the second dispersion, this can be achieved through agitation for less than one hour to a few hours. Besides clay, polyvinyl pyrrolidone, polyethylene oxide and water, the second dispersion can contain additional ingredients. Such addenda can include, but are not limited to, surfactants, coating aids, dispersants, other solvents, plasticizers, inorganic or organic particles, electrically conducting or non-conducting materials, salts, electrolytes, other polymers and clay intercalants (materials capable of intercalating inside the clay lattice), lubricating agents, cross-linking agents, colorants and dyes, compatibilizers, biocites, controlled-release agents, drugs, aroma or fragrance providing agents, etc.

The second dispersion is next slowly poured into a large quantity of ketone, preferably acetone, at room temperature, resulting in flocculation of the solid content of the second dispersion. Details for such flocculation technique are known in the art, for example, that of emulsion polymerization.

The flocculate is subsequently recovered by centrifugation, filtration, or any other separation means, followed by drying in air or vacuum.

The dry solid obtained through the method of the present invention is a nanocomposite of polyethylene oxide, clay, and polyvinyl pyrrolidone wherein the polyethylene oxide is of reduced crystallinity, as verified by appropriate X-ray diffraction characterization techniques discussed hereinbelow.

Characterization of the nanocomposite materials obtained through the method of the present invention, specifically the state of clay intercalation and the degree of crystallinity of polyethylene oxide, is carried out using X-ray diffraction. A Rigaku RU-300 diffractometer equipped with a copper anode, diffracted beam graphite monochromator, and scintillation detector was utilized for diffraction pattern measurement. Specifically, synthetic smectite clay shows a (001) basal plane diffraction peak with an interplanar spacing of 13 to 13.6 Å under ambient conditions, as disclosed in U.S. Pat. Nos. 5,891,611 and 5,981,126. If the clay has been intercalated, this basal plane spacing will increase which is shown by X-ray diffraction as a lower 2θ diffraction peak angle in the diffraction pattern. Crystallinity of polyethylene oxide is assessed by the absence or presence of primary diffraction peaks at 2θ angles of 19.2° and 23.2° when using CuKα radiation. A peak height ratio of the X-ray diffraction peak at a Bragg angle of 23.2° 2θ attributed to polyethylene oxide to the X-ray diffraction (001) peak attributed to the clay is obtained. This peak height ratio will be referred to as the $I_{PEO}/I_{Clay}$ ratio henceforth. In this invention, the $I_{PEO}/I_{Clay}$ ratio of less than 0.6 and preferably less than 0.3 and more preferably less than 0.1 is considered to be demonstrative of reduced crystallinity for the polyethylene oxide.

Sample Preparation

Clay sol:

The clay used in the following samples is either natural montmorillonite clay or synthetic hectorite, Laponite RDS, supplied by Southern Clay Products. The clay sol is prepared by dispersing the clay in deionized water at 2% weight level.

Polyvinyl pyrrolidone (PVP) solution

The PVP solution is prepared by dissolving dry PVP of Mw 30000 in deionized water at 2% weight level.

Polyethylene oxide (PEO)

PEO used in the following samples is a commercial grade polyethylene oxide, Polyox WSR 750, Mw 300,000, supplied by Union Carbide. Hereinbelow PEO is incorporated either in its solid form or in aqueous solution form at different solid content.

In the following examples in accordance with the instant invention, a first dispersion is prepared by mixing a clay sol with a PVP solution in the ratio of 70:30, and then adding a desired amount of polyethylene oxide to this first dispersion to form the second dispersion. This second dispersion is then slowly poured into a large quantity of acetone, whereby the composite solid material of the second dispersion is flocculated. The flocculate is typically recovered by centrifuging, filtration, or separation funnel, subsequently dried in air or vacuum, and further tested by X-ray diffraction technique.

The following examples illustrate the practice of this invention. They are not intended to be exhaustive of all possible variations of the invention. Parts and percentages are by weight unless otherwise indicated.

EXAMPLES and

Comparative Samples

Example 1

(Invention)

A composite of PEO, synthetic hectorite, and PVP in the dry weight ratio of 65:24.5:10.5, obtained from the appropriate second dispersion being flocculated in acetone and subsequently separated by centrifuging, followed by air drying. This sample appeared transparent.

Example 2

(Invention)

Same as Example 1, but with final drying in vacuum (instead of air). This sample appeared transparent.

Comparative Sample A

A composite of PEO, Laponite clay, and PVP in the dry weight ratio of 65:24.5:10.5, obtained from air drying appropriate second dispersion (without flocculation of second dispersion in acetone, as followed in Example 1). This sample appeared hazy.

Example 3
(Invention)

Same as Example 1, but with PEO, montmorillonite clay, and PVP in the dry weight ratio of 80:14:6. This sample appeared transparent.

Example 4
(Invention)

Same as Example 2, but with PEO, montmorillonite clay, and PVP in the dry weight ratio of 80:14:6. This sample appeared transparent.

Comparative Sample B

Same as Comparative Sample A but with a composite of PEO, montmorillonite clay, and PVP in the dry weight ratio of 80:14:6. This sample appeared very hazy.

Comparative Sample C

Solid PEO obtained by flocculating an aqueous solution of PEO in acetone and subsequently separated by centrifuging, followed by air drying. This sample appeared very hazy.

Comparative Sample D

A composite of PEO and PVP in the dry weight ratio of 85:15 obtained from appropriate aqueous solution containing both, being flocculated in acetone and subsequently separated by centrifuging, followed by air drying. This sample appeared very hazy.

Comparative Sample E

A composite of PEO and Tergitol (commercial polyethylene glycol, supplied by Union Carbide) in the dry weight ratio of 90:10 PEO:Tergitol obtained from appropriate aqueous solution containing both, being flocculated in acetone and subsequently separated by centrifuging, followed by air drying. This sample appeared very hazy.

Comparative Sample F

A composite of PEO, Aerosil (commercial fumed silica, supplied by Degussa) and PVP in the dry weight ratio of 65:24.5:10.5, obtained from an appropriate aqueous dispersion being flocculated in acetone and subsequently separated by centrifuging, followed by air drying. This sample appeared hazy.

X-ray diffraction data obtained from a few select examples and comparative samples are presented in FIGS. 1–4 and in Table 1. Data from differential scanning calorimetry are presented in Table 2 for further characterization and comparison of the nanocomposite of the present invention, with respect to crystalline, neat polyethylene oxide.

TABLE 1

X-ray diffraction peak height intensity (I)
for (001) clay and PEO 23.2° peaks and $I_{PEO}/I_{Clay}$ ratio

| Sample ID | $I_{clay}$ (001) | $I_{PEO}$ 23.2° | $I_{PEO}/I_{Clay}$ |
|---|---|---|---|
| Comparative Sample A | 7482 | 5322 | 0.71 |
| Example 1 | 5420 | 0 | 0 |
| Example 2 | 4025 | 76 | 0.02 |
| Comparative Sample B | 2302 | 11798 | 5.1 |
| Example 3 | 41988 | 0 | 0 |
| Example 4 | 23362 | 0 | 0 |

It is clear from FIG. 1 that PVP intercalates inside the clay lattice shown by a shift of the clay (001) basal plane spacing towards lower 2θ angle in the clay/PVP composite (FIG. 1B), with respect to just clay (FIG. 1A). It is also clear that in the PEO/clay/PVP composite of Example 1 (invention) (FIG. 1C), further intercalation of the clay (001) basal plane occurs indicating the nanocomposite nature of Example 1, prepared as per invention. The (001) basal plane d-spacings are 13.1 Å (FIG. 1 curve A), 22.8 Å (FIG. 1 curve B), and 26.2 Å (FIG. 1 curve C).

Figure 2:
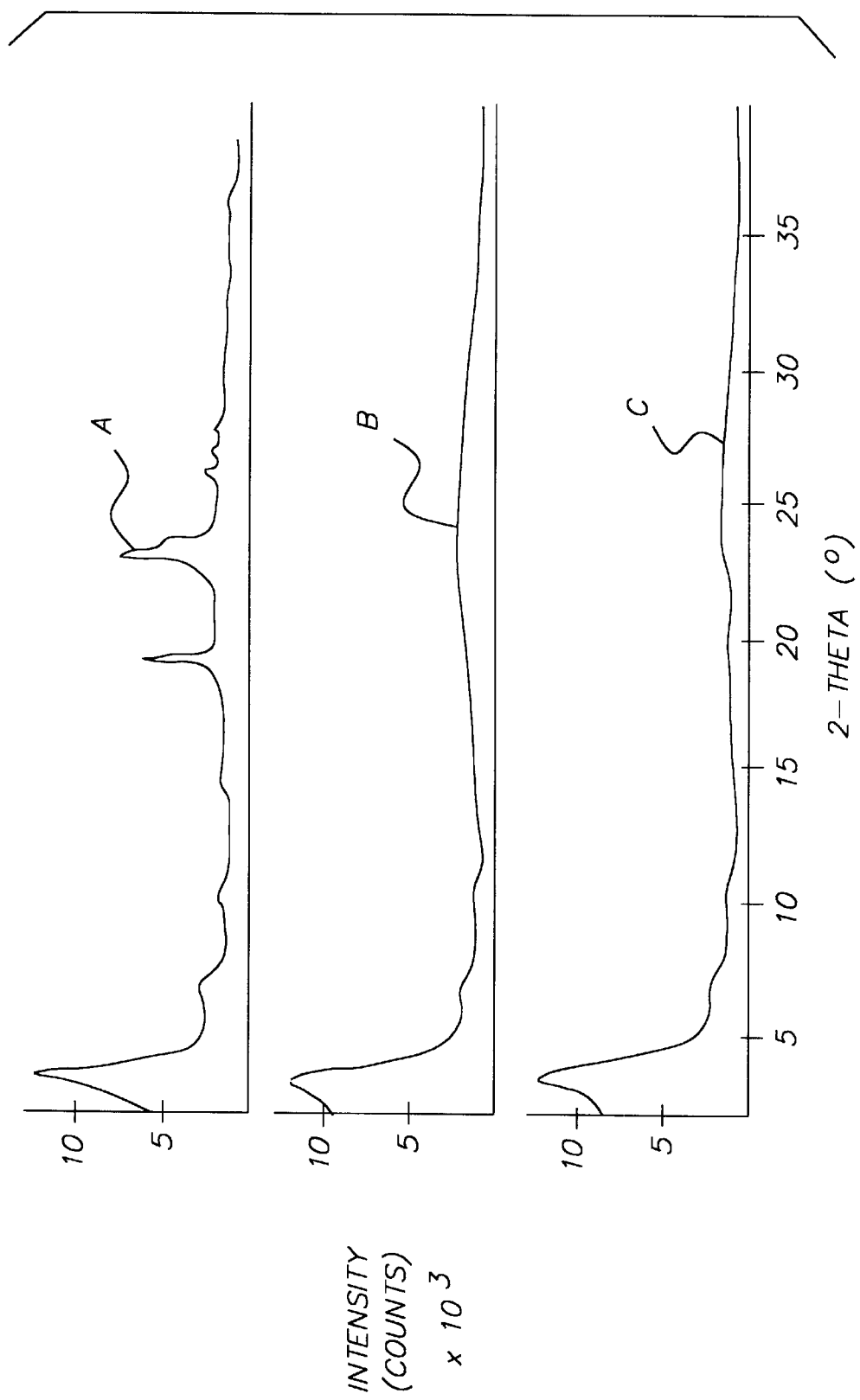
FIG. 2. XRD patterns from dry samples of (A) Comparative Sample A, (B) Example 1, and (C) Example 2.

It is clear from FIG. 2 and Table 1 that Examples 1 and 2, prepared as per invention, contain PEO of reduced crystallinity, whereas Comparative Sample A does not. These results demonstrate the effectiveness of the instant invention in rendering PEO to reduced crystallinity when a synthetic hectorite clay is used. The (001) basal plane d-spacings are 26.3 Å (FIG. 2 curve A), 26.9 Å (FIG. 2 curve B), and 26.4 Å (FIG. 2 curve C).

Differential scanning calorimetry is also utilized to assess PEO crystallinity. An aliquot of neat PEO is compared to an aliquot of Example 1 material. Both samples are processed through a heat-cool-heat-cool-heat thermal cycle as an extreme test to evaluate the stability of reduced crystallinity in Example 1. The heat of fusion results from differential scanning calorimetry are shown in Table 2. The data for Example 1 are shown for as collected (measured value) and normalized to account for the dilution of the PEO in the PEO/clay-PVP matrix of Example 1.

TABLE 2

Differential scanning calorimetry results for pure PEO and Example 1

| Heat step | $\Delta H_f$ (J/g) of neat PEO | $\Delta H_f$ (J/g) of Example 1 (65 weight % PEO) | $\Delta H_f$ (J/g) of Example 1 (normalized 100% PEO) |
|---|---|---|---|
| $1^{st}$ heat | 178 | 16.2 | 24.9 |
| $2^{nd}$ cool | 131 | 7.7 | 11.8 |
| $3^{rd}$ heat | 137 | 8.1 | 12.5 |
| $4^{th}$ cool | 130 | 7.1 | 10.9 |
| $5^{th}$ heat | 135 | 8.2 | 12.6 |

It is clear from Table 2 that Example 1, prepared as per invention, contains PEO of reduced crystallinity when compared to neat PEO. These results demonstrate the effectiveness of the instant invention in rendering PEO to reduced crystallinity.

Figure 3:
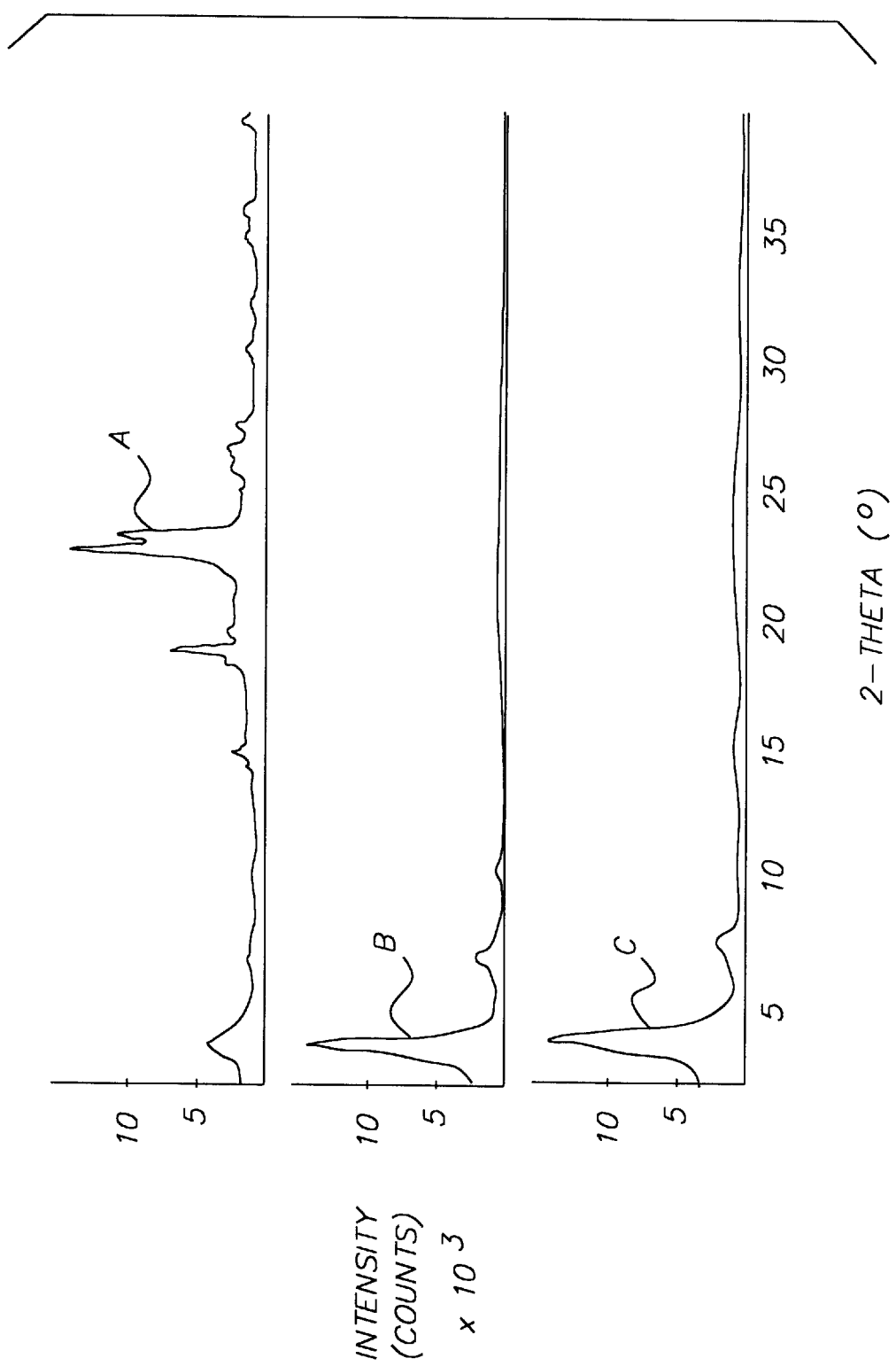
FIG. 3. XRD patterns from dry samples of (A) Comparative Sample B, (B) Example 3, and (C) Example 4.

It is clear from FIG. 3 and Table 1 that Examples 3 and 4, prepared as per invention, contain PEO of reduced crystallinity, whereas Comparative Sample B does not. These results demonstrate the effectiveness of the instant invention in rendering PEO to reduced crystallinity when natural montmorillonite clay is used. The (001) basal plane d-spacings are 24.3 Å (FIG. 3 curve A), 24.8 Å (FIG. 3 curve B), and 24.0 Å (FIG. 3 curve C).

Figure 4:
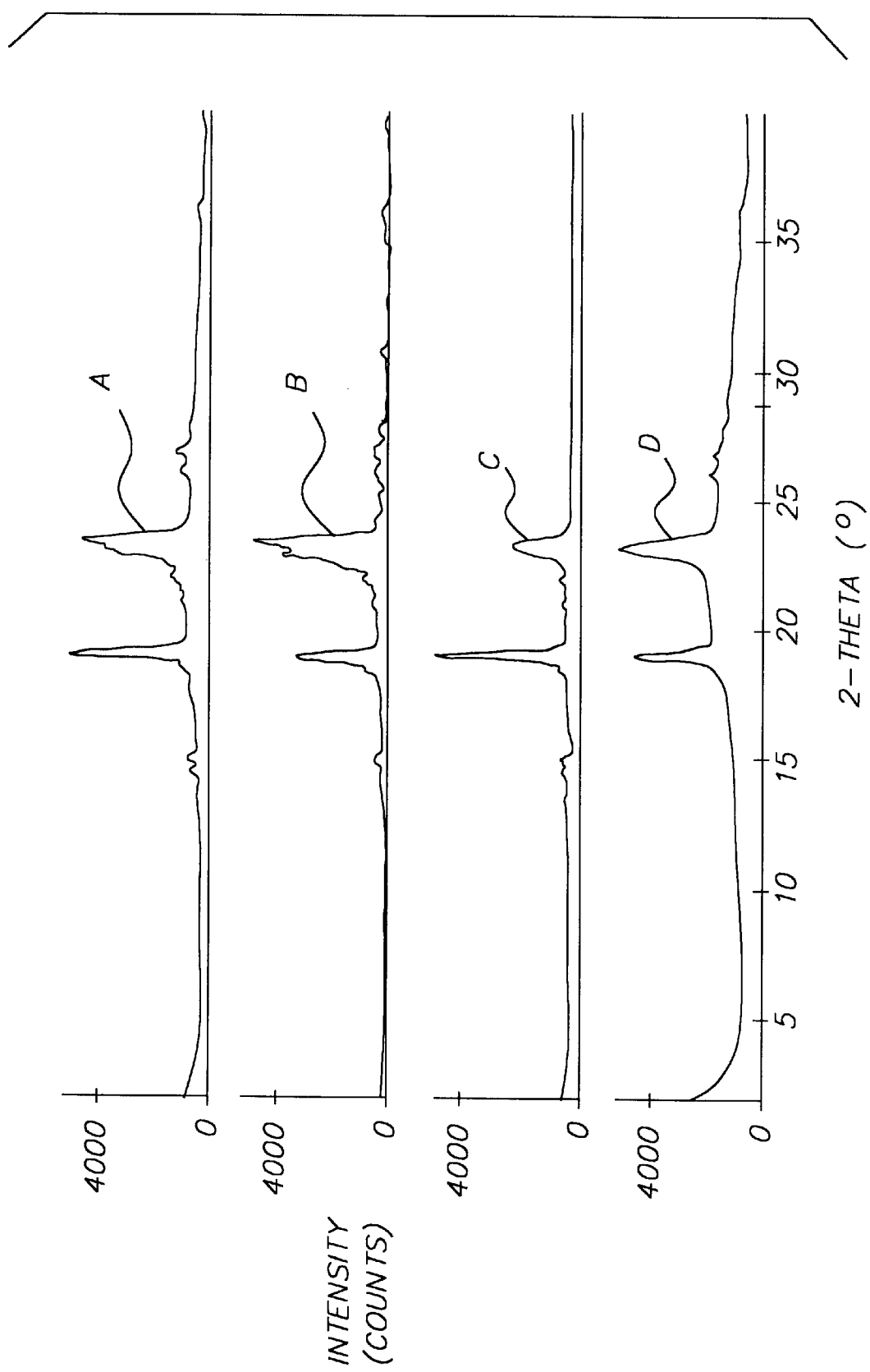
FIG. 4. XRD patterns from dry samples of (A) Comparative Sample C, (B) Comparative Sample D, (C) Comparative Sample E, and (D) Comparative Sample F.

It is clear from FIG. 4 that Comparative Samples C–F, not prepared as per the invention (without clay), contain PEO with significant crystallinity. These results demonstrate that any deviation from the teachings of the instant invention does not result in the desired reduction of crystallinity in PEO.

The invention has been described in detail with particular reference to certain preferred embodiments thereof, but it will be understood that variations and modifications can be effected within the spirit and scope of the invention.

What is claimed is:

1. A method of forming a polymer composite comprising mixing smectite clay and polyvinyl pyrrolidone to form a first dispersion of intercalated clay, mixing said dispersion with polyethylene oxide to form a second dispersion, flowing said second dispersion into ketone so as to flocculate a polymer composite of polyethylene oxide and intercalated clay and recovering said flocculate.

2. The method of claim 1 where said recovered flocculate is dried.

3. The method of claim 2 wherein said flocculate has a $I_{PEO}/I_{Clay}$ ratio of less than 0.6, wherein said $I_{PEO}/I_{Clay}$ ratio comprises a peak height ratio of the X-ray diffraction peak $I_{PEO}$ attributed to polyethylene oxide to the X-ray diffraction (001) peak $I_{Clay}$ attributed to the clay at a Bragg angle of 23.2° 2θ.

4. The method of claim 2 wherein said flocculate has a $I_{PEO}/I_{Clay}$ ratio of less than 0.3, wherein said $I_{PEO}/I_{Clay}$ ratio comprises a peak height ratio of the X-ray diffraction peak $I_{PEO}$ attributed to polyethylene oxide to the X-ray diffraction (001) peak $I_{Clay}$ attributed to the clay at a Bragg angle of 23.2° 2θ.

5. The method of claim 2 wherein said flocculate has a $I_{PEO}/I_{Clay}$ ratio of less than 0.1, wherein said $I_{PEO}/I_{Clay}$ ratio comprises a peak height ratio of the X-ray diffraction peak $I_{PEO}$ attributed to polyethylene oxide to the X-ray diffraction (001) peak $I_{Clay}$ attributed to the clay at a Bragg angle of 23.2° 2θ.

6. The method of claim 1 wherein first dispersion solids content has a clay weight percent range of 20 to 80 and a polyvinyl pyrrolidone weight percent range of 80 to 20.

7. The method of claim 1 wherein first dispersion solids content has a clay weight percent range of 50 to 70 and a polyvinyl pyrrolidone weight percent range of 50 to 30.

8. The method of claim 1 wherein first dispersion solids content has a clay weight percent of 70 and a polyvinyl pyrrolidone weight percent of 30.

9. The method of claim 1 wherein said first dispersion comprises less than 99 percent solids with the remainder water.

10. The method of claim 1 wherein said clay comprises at least one member selected from saponites and montmorillonites.

11. The method of claim 1 wherein said clay comprises at least one member selected from the species hectorite and montmorillonite.

12. The method of claim 1 wherein said clay comprises a synthetic smectite.

13. The method of claim 1 wherein said clay comprises a layered hydrous magnesium silicate.

14. The method of claim 1 wherein said clay comprises an organically modified smectite clay.

15. The method of claim 1 wherein said polyvinyl pyrrolidone has a molecular weight range of 100 to 1,000,000.

16. The method of claim 1 wherein said polyvinyl pyrrolidone has a molecular weight range of 1,000 to 500,000.

17. The method of claim 1 wherein said polyvinyl pyrrolidone has a molecular weight of 20,000 to 50,000.

18. The method of claim 1 wherein said second dispersion comprises less than 99 percent solids with the remainder water.

19. The method of claim 1 wherein said second dispersion comprises less than 30 percent solids with the remainder water.

20. The method of claim 1 wherein said polyethylene oxide is in solid form when mixed with said first dispersion.

21. The method of claim 1 wherein said polyethylene oxide is in solution with water when mixed with said first dispersion.

22. The method of claim 1 wherein said polyethylene oxide has a molecular weight of between 1,000 and 5,000,000.

23. The method of claim 1 wherein said polyethylene oxide has a molecular weight of between 100,000 and 500,000.

24. The method of claim 1 wherein said ketone comprises acetone.

25. The method of claim 1 wherein said clay comprises particles of a lateral dimension between 0.005 μm and 10 μm and a thickness of between 0.0005 μm and 0.1 μm.

26. The method of claim 1 wherein said clay comprises particles of a lateral dimension between 0.01 μm and 1 μm and a thickness of between 0.001 μm and 0.1 μm.

27. A polymer composite comprising a smectite clay intercalated with polyvinyl pyrrolidone and polyethylene oxide wherein said composite has $I_{PEO}/I_{Clay}$ ratio measured by X-ray diffraction of less than 0.6, wherein said $I_{PEO}/I_{Clay}$ ratio comprises a peak height ratio of the X-ray diffraction peak $I_{PEO}$ attributed to polyethylene oxide to the X-ray diffraction (001) peak $I_{Clay}$ attributed to the clay at a Bragg angle of 23.2° 2θ.

28. The polymer composite of claim 26 wherein the $I_{PEO}/I_{Clay}$ ratio is less than 0.3, wherein said $I_{PEO}/I_{Clay}$ ratio comprises a peak height ratio of the X-ray diffraction peak $I_{PEO}$ attributed to polyethylene oxide to the X-ray diffraction (001) peak $I_{Clay}$ attributed to the clay at a Bragg angle of 23.2° 2θ.

29. The polymer composite of claim 26 wherein the $I_{PEO}/I_{Clay}$ ratio is less than 0.1, wherein said $I_{PEO}/I_{Clay}$ ratio comprises a peak height ratio of the X-ray diffraction peak $I_{PEO}$ attributed to polyethylene oxide to the X-ray diffraction (001) peak $I_{Clay}$ attributed to the clay at a Bragg angle of 23.2° 2θ.

* * * * *

UNITED STATES PATENT AND TRADEMARK OFFICE
CERTIFICATE OF CORRECTION

PATENT NO.     : 6,555,610 B1
DATED          : April 29, 2003
INVENTOR(S)    : Thomas N. Blanton et al.

It is certified that error appears in the above-identified patent and that said Letters Patent is hereby corrected as shown below:

<u>Title page,</u>
After Item [57], "29 Claims", change to -- 30 Claims --

<u>Column 12,</u>
Line 50, insert -- 30. The method of Claim 1 wherein said first dispersion comprises less than 10 percent solids with the remainder water. --

Signed and Sealed this

Fourth Day of November, 2003

JAMES E. ROGAN
*Director of the United States Patent and Trademark Office*